May 26, 1959  A. RICHTER  2,887,882

PRESSURE-VOLTAGE TRANSDUCING ELEMENT

Filed May 11, 1956

INVENTOR.
ALBERT RICHTER

United States Patent Office 2,887,882
Patented May 26, 1959

2,887,882

PRESSURE-VOLTAGE TRANSDUCING ELEMENT

Albert Richter, Lynbrook, N.Y., assignor to Sperry Rand Corporation, Ford Instrument Company Division, Long Island City, N.Y., a corporation of Delaware Application May 11, 1956, Serial No. 584,338

2 Claims. (Cl. 73—398)

The invention relates in general to measuring devices and more particularly to devices for measuring the differential between two pressures.

In measuring devices for measuring a pressure differential it is customary to make use of a bellows, a diaphragm or a Bourdon tube, all of which produce a mechanical movement proportional to the pressure differential. The mechanical motion produced may vary the position of a magnetic core to change the inductance or mutual inductance of a coil and the change in coil properties may be used as a measure of a pressure differential. The use of mechanical motion and flexing elements introduces the difficulty of fatigue and eventual failure of the parts. In addition, special precautions must be observed to prevent the entrance of dirt into the mechanism with the consequent possibility of introducing inaccuracies in measurement or overloading which may harm the element.

It is therefore an object of the invention to provide improved means for measuring a pressure differential.

Another object of the invention is to provide a device for measuring a pressure differential that has no moving parts.

A still further object of the invention is to provide a device for measuring a pressure differential which is small, compact and endurable.

To these ends the invention contemplates the use of a tube made of a ferromagnetic material having a coil wound around it. When a pressure is introduced inside of the tube a pressure differential will be produced across its walls and this will in turn produce a stress in the material. The stress changes the magnetic properties of the ferromagnetic tube material proportionally and the coil wound on the tube due to changes in the magnetic properties of the tube will also measurably change its inductive properties.

The invention has other objects and advantages which will appear from the following description of a particular embodiment of the invention in conjunction with the accompanying drawings, in which.

Figure 1:
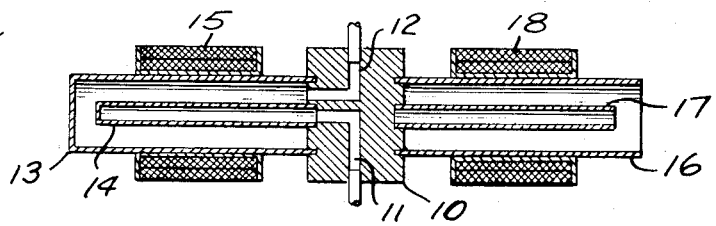
Figure 1 shows a longitudinal section of a particular embodiment of the invention.

With reference to Figure 1, the particular embodiment shown there of the invention comprises, in general, a mounting block 10, a ferromagnetic tube 14 which is sealed at one end and has its open end integrally connected to block 10 whereby the inside of tube 14 is exposed to an outside surface of block 10 through a hole 11 which is in block 10, a non-magnetic tube 13 which is sealed at one end and has its open end integrally connected to block 10 and concentrically about tube 14 whereby the inside of a tube 13 is exposed to an outside surface of block 10 through a hole 12 which is in block 10, a transformer 15 is circumferentially disposed about the outside and along the longitudinal axis of tube 13, a ferromagnetic tube 17 is integrally connected to another section of block 10, a non-magnetic tube 16 is integrally connected to block 10 and concentrically about tube 17 and a transformer 18 which is circumferentially disposed about the outside and along the longitudinal axis of tube 16.

Figure 2:
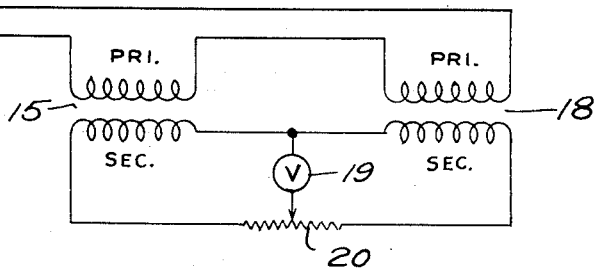
Figure 2 shows a schematic representation of a particular electrical sensing means for the invention as shown in Figure 1.

With reference to Figure 2, the particular electrical sensing means shown there of the invention as shown in Figure 1 comprises, in general, a transformer 15 having primary and secondary coils, a transformer 18 having primary and secondary coils, a potentiometer 20 connected in series with the secondary coils of transformers 15 and 18 which are connected in series respectively, a voltmeter 19 connected across the moving arm of potentiometer 20 and between the secondary coils of transformers 15 and 18 and a source of alternating current connected across the primary coils of transformers 15 and 18 which are connected in series respectively.

Figure 3:
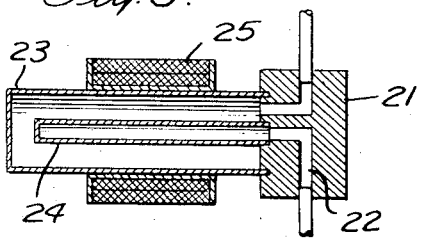
Figure 3 shows a longitudinal section of a simplified embodiment of the invention.

With reference to Figure 3, the simplified embodiment shown there of the invention comprises, in general, a mounting block 21, a ferromagnetic tube 24 which is sealed at one end and has its open end integrally connected to block 21 whereby the inside of tube 24 is exposed to an outside surface of block 21 through a hole 22 which is in block 21, a non-magnetic tube 23, which is sealed at one end and has its open end integrally connected to block 21 and concentrically about tube 24 and a coil 25 which is circumferentially disposed about the outside and along the longitudinal axis of tube 23.

Figure 4:
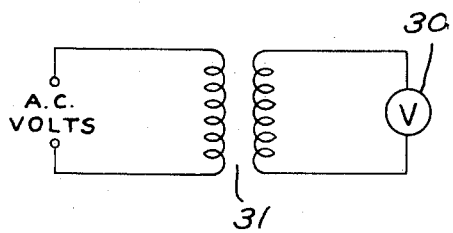
Figure 4 shows a schematic representation of an electrical sensing means for the invention as shown in Figures 3 and 4.

With reference to Figure 4, the electrical sensing means shown there comprises, in general, a transformer 31 having primary and secondary coils, a voltmeter 30 connected across the secondary coil and a source of alternating current connected across the primary coil.

The operation of the pressure differential measuring device can best be understood by first considering the principles on which the operation is based such as the Villari effect which is the change in magnetic properties of ferromagnetic materials when subjected to mechanical stress.

For example, if a piece of nickel is used as a core for an electromagnet the peak flux density in the core for a given A.C. current will be a constant value depending on the permeability of the nickel. If the core is subjected to stresses, the peak flux density in the core will be found to vary. In the case of nickel the peak flux density will decrease as the stress is increased. Conversely, varying the current in the coil will change the peak flux density in the core and thereby the effect of the stresses on the core.

If a transformer is constructed on a core of nickel the voltage induced in the secondary would be proportional to the time rate of change of the flux linked with it. A sinusoidal voltage applied to the primary would generate a sinusoidal varying flux in the core. This flux will in turn induce in the secondary a sine wave voltage the magnitude of which will depend on the magnitude of the rate of change of the flux density. The slope at a given point on any sine function is proportional to the maximum amplitude or peak value reached by the function. Since the flux is sinusoidal, then its rate of change will also be proportional to the peak flux value which will in turn be proportional to the physical condition of the core. If the nickel is stressed, the peak flux density will decrease, its rate of change will decrease and the secondary voltage will decrease as well. Any change in the stress condition of the core will effect the secondary voltage.

Materials having magnetostrictive properties are materials such as nickel, iron, Permalloy, cobalt, iron-cobalt alloy and iron-nickel alloy.

Materials having non-magnetic properties are materials such as non-magnetic stainless steel of the AISI 300 series, brass, copper, zinc-base alloy, aluminum, magnesium and plastics.

Referring to Figures 1 and 2 when a high pressure is applied inside ferromagnetic tube 14 through hole 11 which is in mounting block 10 and a low pressure is applied inside non-magnetic tube 13 through hole 12 which is in mounting block 10 the difference between the two applied pressures then acts across tube 14 to produce a stress. The transformer 15 about tube 13 will with a constant current in its primary coil induce a voltage in its secondary coil that will depend on the stress in tube 14 and therefore on the pressure differential.

With ferromagnetic tube 17 and non-magnetic tube 16 vented so that external pressure is employed the voltage induced in the secondary coil of transformer 18 by the primary coil of transformer 18 can be used as a standard comparison measurement since it will measure the various ambient conditions.

Since the secondary are connected in series but with their voltages opposing, the voltage output from the unit will be the difference between the voltages developed across the secondaries. The potentiometer 20 can be suitably calibrated so that its movable arm will read the differences in applied pressures across tube 14 compensated for various ambient conditions, when the movable arm of potentiometer 20 is moved in conjunction with voltmeter 19 acting as a nulling indicator.

Referring to Figure 3 it is readily seen that this simplified embodiment of the invention works in the same manner as the particular embodiment of Figure 1 except that there is no means for measuring the ambient conditions, and the low pressure applied to the inside of non-magnetic tube 23 is a fixed reference pressure. If the low pressure is set at 0 pound per square inch then the pressure differential measured across the ferromagnetic tube 24 will be absolute pressure. If the low pressure is set at 14.7 pounds per square inch then the pressure differential measured across the ferromagnetic tube 24 will be gauge pressure.

If Figure 4 is used as the elctrical sensing means for measuring the pressure differential of the simplified embodiment of the invention as shown in Figure 3 then coil 25 about non-magnetic tube 23 will be transformer 31 which will with a constant current in its primary coil induce a voltage in its secondary coil that will depend on the stress in the ferromagnetic tube 24 which was produced by the pressure differential across the tube 24. Voltmeter 30 connected across the secondary coil of transformer 31 will read the induced voltages in the secondary coil. Since the induced voltages in the secondary coil of transformer 31 are proportional to the pressure differential across tube 24, voltmeter 30 can be modified to read the pressure differential across the tube 24.

Although I have described particular embodiments of the invention, it is understood that the present disclosure has been made by way of example and that numerous changes in the details of construction and the combuination and arrangement of parts may be resorted to without departing from the spirit and the scope of the invention as hereinafter claimed.

What is claimed is:

1. A fluid pressure gauge of the character described comprising a mounting block, an elongated small diameter outer tube of non-magnetic material having a closed outer end and the inner end thereof secured to said mounting block, an inner tube of magnetostrictive material concentrically disposed within said outer tube with the outer walls thereof spaced from the inner walls of said outer tube, the inner end of said inner tube being secured to said mounting block and the outer end thereof closed, a conduit in said mounting block through which fluid pressure to be measured is supplied directly to said inner tube, a second conduit in said mounting block independent of said first conduit through which a reference fluid pressure is supplied directly to said outer tube, a transformer having a primary winding and a secondary winding disposed about said outer tube, a current source connected to said primary winding, and voltage responsive means connected to said secondary winding, said voltage responsive means being operative to indicate the difference in fluid pressure between the pressures in said inner and outer tubes.

2. A fluid pressure gauge of the character described comprising a mounting block, an elongated small diameter outer tube of non-magnetic material having a closed outer end and the inner end thereof secured to said mounting block, an inner tube of magnetostrictive material concentrically disposed within said outer tube with the outer walls thereof spaced from the inner walls of said outer tube, the inner end of said inner tube being secured to said mounting block and the outer end thereof closed, a conduit in said mounting block through which fluid pressure to be measured is supplied directly to said inner tube, a second conduit in said mounting block independent of said first conduit through which a reference fluid pressure is supplied directly to said outer tube, another outer tube of non-magnetic material similar to said outer tube but having an open outer end, another inner tube of magnetostrictive material but having an open outer end, the inner end of said other outer tube being secured to said mounting block, said another inner tube being disposed concentrically within said another outer tube with the outer wall of said another inner tube being spaced from the inner wall of said another outer tube, a transformer having a primary winding and a secondary winding disposed about said outer tube, another transformer having a primary winding and a secondary winding disposed about said another outer tube, the primary windings of said transformer and said another transformer being connected in series to a current source, the secondary windings of said transformer and said another transformer being connected in series opposition, and voltage responsive means connected between the opposed ends of the secondary winding of said transformer and the secondary winding of said another transformer, said voltage responsive means being operative to indicate the difference in fluid pressure between the pressure in said inner and outer tubes, and said another outer tube and said another inner tube serving as a standard unit for comparison with the differential pressure assembly constituted by said inner and outer tubes, and operative to compensate for various ambient changes.

References Cited in the file of this patent

UNITED STATES PATENTS

| | | |
|---|---|---|
| 2,269,760 | Eldredge | Jan. 13, 1942 |
| 2,376,156 | Kuehni | May 15, 1945 |
| 2,460,076 | Emerson | Jan. 25, 1949 |
| 2,461,635 | Feller | Feb. 15, 1949 |
| 2,566,326 | Guillemin | Sept. 4, 1951 |
| 2,715,680 | Tatel et al. | Aug. 16, 1955 |